(12) United States Patent
DeWaard et al.

(10) Patent No.: US 11,680,000 B2
(45) Date of Patent: Jun. 20, 2023

(54) AUTOMATED MANIFOLD FOR REMOVING DIGESTATE FROM A LAGOON DIGESTER

(71) Applicants: David DeWaard, Lynden, WA (US); Shane Hansen, Visalia, CA (US)

(72) Inventors: David DeWaard, Lynden, WA (US); Shane Hansen, Visalia, CA (US)

(*) Notice: Subject to any disclaimer, the term of this patent is extended or adjusted under 35 U.S.C. 154(b) by 62 days.

(21) Appl. No.: 17/202,114

(22) Filed: Mar. 15, 2021

(65) Prior Publication Data
US 2022/0289605 A1 Sep. 15, 2022

(51) Int. Cl.
C02F 3/28 (2023.01)
C02F 103/00 (2006.01)
C02F 103/20 (2006.01)

(52) U.S. Cl.
CPC ........ C02F 3/286 (2013.01); *C02F 2103/007* (2013.01); *C02F 2103/20* (2013.01); *C02F 2209/40* (2013.01); *C02F 2209/42* (2013.01)

(58) Field of Classification Search
CPC .......... C02F 3/286; C02F 2103/007; C02F 2103/20; C02F 2209/40; C02F 2209/42
USPC .......................... 210/603, 614, 259
See application file for complete search history.

(56) References Cited

U.S. PATENT DOCUMENTS

| | | | | |
|---|---|---|---|---|
| 6,860,997 | B1 * | 3/2005 | Frederick ................ | C02F 3/286 210/260 |
| 9,005,442 | B2 * | 4/2015 | Reid ........................ | C02F 3/286 210/603 |
| 2004/0154982 | A1 * | 8/2004 | Irani ........................ | C12M 23/38 210/603 |

FOREIGN PATENT DOCUMENTS

| | | | |
|---|---|---|---|
| CN | 102107987 | A * | 6/2011 |
| CN | 204417505 | U * | 6/2015 |
| EP | 0036915 | A1 * | 10/1981 |
| FR | 2519965 | A1 * | 7/1983 |

OTHER PUBLICATIONS

Machine-generated English translation of FR 2519965, dated Aug. 10, 2022.*
Machine-generated English translation of CN 204417505, dated Aug. 10, 2022.*
Machine-generated English translation of EP 0036915, dated Aug. 10, 2022.*

* cited by examiner

*Primary Examiner* — Fred Prince
(74) *Attorney, Agent, or Firm* — Williams Kastner & Gibbs PLLC; Mark Lawrence Lorbiecki (57) ABSTRACT

An extraction manifold for extracting digestate from a covered lagoon digester includes a digester vessel being shaped generally as a rectangular prism lacking an upward facing face and having a floor sloping generally downward from an intake face to an extraction face of the digester vessel. The intake face and extraction face are oriented vertically, situated in opposed relation on a longer horizontal axis. Each effluent pipe terminates in an extraction nozzle on one end and an independently addressable actuatable valve on the opposite end. Each actuatable valve communicates with a manifold plenum such that actuation of the valve draws digestate from the floor in a region of the floor adjacent to the extraction face and in proximity to the extraction nozzle. A valve controller actuates valves to remove digestate from the region of the floor adjacent to the extraction face. The valve controller includes sensors to monitor biogas production.

20 Claims, 7 Drawing Sheets

AUTOMATED MANIFOLD FOR REMOVING DIGESTATE FROM A LAGOON DIGESTER

FIELD OF INVENTION

This disclosure relates to the field of covered lagoon anaerobic digesters and, more particularly, to systems and methods for drawing digestate from the lagoon.

BACKGROUND

Traditionally, manures (livestock residues or pig slurry, chicken manure, etc.) have been used as agricultural fertilizers due to their high content of organic matter and mineral nutrients. Manures can be important sources of nutrients for crops, but manure must be managed properly to prevent loss of nutrients to the environment in air or ground or surface water.

Stabilization of manure is important prior to successfully recycling the organic material back to arable lands. The stabilization process reduces the organic matter and water contents, unpleasant odors, concentrations of pathogenic microorganisms, and weed seeds. One means of stabilization is by Anaerobic digestion and, in warmer climates, much anaerobic digestion is accomplished in covered lagoon anaerobic digesters which also produced renewable energy in the form of methane-rich biogas.

Sand-laden manure is a mucosal gel within which sand grains, along with water, are enveloped between the folds of long chain carbohydrates. Sand is not necessarily in suspension in undiluted sand-laden manure mass, but instead held intact due to the viscous nature of the manure. Some sand grains settle from undiluted sand laden manure—those that possess the physical characteristics enabling them to overcome slurry viscosity. Sand settles primarily in the presence of dilution. The suspended colloidal solids in manure, however, carry a negative or anionic surface charge, which disperses the particles and keeps them in suspension while the bacterial flora in the lagoon performs anaerobic digesion. Factors affecting sand settling can be described using Stokes' Law, which states, settling velocity is directly related to: the difference in density between the particle (sand) and the medium (manure); the square of particle diameter (d); and inversely related to viscosity. Stokes Law is essentially an expression of a ratio of inertial forces and viscous forces acting on a particle. In short, large, dense particles in clean water settle fastest compared to small, less dense particles in dirty water.

Scour is a phenomenon by which particles are kept in suspension or suspension is initiated by flowing with water. As it relates to dilute sand-laden manure, Shields' equation models (validated in practice) is used to calculate a scour velocity in pipes or channels designed to convey dilute sand and manure for specific particle sizes. Since scour velocity is directly related to particle size (amongst other factors), to maintain scour (in flume pipes), the largest particle in the gradation should be considered. In short, therefore, where the goal of conveying sand laden manure is to maintain particles in suspension, the velocity of the colloidal manure suspension must exceed the number calculated in the Shields Equation. On the other hand, where the goal is that of separation the velocity is selected to allow sand grains to settle. The principles of settling and scour support design considerations related to manure handling and separation systems.

Controlling scour and settling is important to successful design and operation of any sand-laden manure handling system. Failing to properly account for settling and scour leads to pipes, channels and tanks full of sand as well as dirty separated sand (e.g. high organic and moisture loading). The same is true within the lagoon of a covered lagoon anaerobic digester.

Settling relies of the force of gravity to remove suspended solids from liquid manure. The size, density, shape, and concentration of the solid particles in liquid manure influence the rate and effectiveness of primary treatment of animal manure by gravitational settling. The settling velocity of discrete particles is constant once they have reached their terminal velocity. Discrete particle settling only occurs for dilute liquid manure. As particles settle, they may form clumps of smaller particles called flocs. These flocs may have a lower density than the individual particles, but they often fall faster since a floc may behave as a single particle with a large diameter. As a result, formation of a sufficient number of flocs may result in an increase in settling velocity. Prediction of floc formation is complicated and depends on a variety of factors, including surface charges, chemical composition of the particles, the amount of organic matter in the suspension, and the amount of contact time between particles. As the settling process progresses, the concentration of particles and flocs becomes so great that they no longer settle independently. Instead particles form a blanket of material that falls at the same rate as liquid flows upward though the void spaces between particles. As a result, a distinct interface develops between the supernatant and the settling mass of solids.

Settling is hindered when the interface between the supernatant and the settling material can be easily observed. Generally, the settling velocity decreases as settling time increases when hindered settling predominates. Hindered settling occurs when the total solids content is above 0.5 percent. Hindered settling is the primary type of settling found when treating manure from many types of animal facilities. Near the end of the hindered settling phase, the layer of settled solids forms a well-defined layer on the bottom of the basin. This layer continues to decrease in height due to compression. This type of settling is called compression settling. The settling velocity becomes essentially linear during compression settling until the material reaches an ultimate concentration.

The breakdown of feedstock in the absence of oxygen is facilitated by a combination of microorganisms present in each stage of the digestion process, leading to the formation of digestate (decomposed feedstock) and a mixture of gases that includes $CH_4$ gas as the main component. Manure is processed through anaerobic digesters, and anaerobically digested solids and liquid effluents are recycled back to fields in the form of digestate, i.e. the leftovers after digestion. The nutrients in the digestate can be used to supplement crop-nutrient needs (e.g., nitrogen (N) and phosphorus (P)). Another by-product of the digestion process is methane gas (biogas) that can be burned in an engine generator system to produce electricity to be used on the farm or sold to the power grid. The biogas can also be burned for heating water or the farm buildings or, conditioned for resale and pumped into pipelines.

Only a fraction of the volatile solids in the manure can be converted to gas by the bacteria. Lignin is practically unaffected by the bacteria in the digester, and cellulose is broken down only very slowly. The volume of the effluent from an anaerobic digester is slightly less (2 to 5%) than the volume of the input, due to biodegradation of some of the volatile solids. Gas and liquid holding solid digestate in suspension will exit a conventional lagoon digester through a displacement system wherein entering manure displaces a nearly equal volume of digestate or digested manure.

Even with good bacterial digestion, significant amounts of sludge accumulate in an anaerobic lagoon. Such is especially true of cattle wastes which contain a relatively high percentage of relatively nondegradable lignin and cellulosic fiber. At some point the treatment capacity of most lagoons will be severely diminished by sludge accumulation. Lagoon sludge solids in conventional covered lagoon anaerobic digestion vessels range from 6-13% solids requiring careful selection of removal equipment.

Operation of any anaerobic digestion, especially seeks to avoid any interruption of the digesting process within the digestion vessel, thereby avoiding the need for shutdown. From shutdown, startup of an anaerobic digester is very time consuming. For a conventional medium-rate farm reactor, startup time after clean-out is variously estimated at 6 to 9 weeks. During startup, the digester is fed at a reduced rate, about 20% of normal, increasing about 20% per week until the optimal loading rate is reestablished. The same start-up process is required following periodic clean-out of the digester to remove accumulated solids in the digester bottom. To preserve productivity of the digester, extending the mean time between cleanouts or eliminating it entirely can remove the need for a second digester to operate during this start-up process of a first digester.

The digestion vessel will act as a repository of all feedstocks. But, as the digester bacteria works on the feedstock, some part of that feedstock becomes fully digested digestate. Relative to the digestion process, such digestate becomes inert and displaces more active content within the digester vessel. Removal of the most digested digestate and of any distinct inert matter such as sand or grit results in improving both digestate quality and preventing the build-up of inert matter which presence might ultimately require a shutdown of the covered lagoon anaerobic digester. The accumulation of might, in the extreme displace enough volume within the lagoon to reduce hydraulic retention time which leads to impairment of the digestion performance and, eventually, to covered lagoon anaerobic digester shutdown and maintenance.

The need exists for an improved method and manifold for removing digestate and inert matter suspended in a lagoon anaerobic digester optimizing the performance of the digester.

SUMMARY OF THE INVENTIVE COVERED LAGOON ANAEROBIC DIGESTER

The invention comprises, in alternate embodiments each of a method for extracting digestate from a covered lagoon digester, a manifold and valve controller to extract digestate in accord with the method, and a covered lagoon digester employing the manifold and valve controller. The digester vessel the embodiments of the invention exploit as presently preferred is shaped generally as a rectangular prism lacking an upward facing face and having a floor sloping generally downward from an intake face to an extraction face of the digester vessel. The intake face and extraction face are oriented vertically and situated in opposed relation one to another on a longer horizontal axis. A cover seals the digester vessel at its upward facing face to catch and retain a volume of biogas the digester produces. An intake nozzle admits manure into an interior of the digester vessel. Many aspects of the digester vessel mimic those of a conventional digester except for the sloping floor in the preferred embodiment.

The inventive digester vessel includes a plurality of effluent pipes. Each effluent pipe terminates in an extraction nozzle and an attached independently addressable actuatable valve which is situated on an opposite end of the effluent pipe from the extraction nozzle. Each actuatable valve is in communication with a manifold plenum such that actuation of the valve establishes communication between the corresponding extraction nozzle and the manifold plenum. Each of the extraction nozzles is situated in the digester vessel to draw digestate from the floor of the digester vessel in a region of the floor adjacent to the extraction face of the digester vessel.

A valve controller system generates signals to actuate, in turn, each of the independently addressable actuatable valves. By actuating the valves in turn rather than simultaneously, the suction generated in a plenum is concentrated to remove digestate from the region of the floor adjacent to the extraction face and the corresponding extraction nozzle.

Using the valve controller system, along with embedded sensors to generate signals representative of at least one of a sensed status group consisting of liquid level, flow of liquid, flow of gas, pH, temperature, conductivity, biogas pressure and volume, fluorescence, volatile fatty acids (VFA), bicarbonate alkalinity, chemical oxygen demand (COD), total organic carbon (TOC), UV-absorbance, turbidity/suspended solids, methane ($CH_4$) or carbon dioxide ($CO_2$), and ammonium; the valve controller system can related the sensed status of the digester vessel and compare that with biogas production. Because the valve controller system records time of sensing corresponding to each generated signal, it can time stamp each of recorded signals received from the sensors in the sensed status group to populate a data store. Then, the valve controller system uses machine learning to generate and optimize algorithms to the production of biogas based upon the recorded signals retrieved from the data store.

The extraction nozzles can be configured in any of a set of nozzle configurations selected from a nozzle configuration group consisting of straight cut nozzle, angled end nozzle, elbow nozzle, and reverse angle nozzle sent into a peri-nozzular depression in the membrane floor.

In some embodiments, the digester may include a sand extraction manifold which works in a manner similar to that of the digestate extraction manifold describe above. Thus, its structure includes a plurality of sand extraction pipes. Each sand extraction pipe terminates in a sand extraction nozzle and includes an attached independently addressable actuatable sand valve. The sand valves are in communication with a sand extraction plenum such that upon being actuated, the actuated sand valve establishes communication between the corresponding sand extraction nozzle and the sand extraction plenum. Each of the sand extraction nozzles is situated to draw sand and manure from the floor generally in a region of the floor adjacent to the intake face and in proximity to the sand extraction nozzle when the corresponding attached independently addressable actuatable sand valves is actuated. The valve controller system to generates further signals to actuate, in turn, each of the independently addressable actuatable sand valves to remove sand and manure from the region of the floor adjacent to the intake face.

BRIEF DESCRIPTION OF THE DRAWINGS

FIGS. 1C1, 1 C2, 1C3 and 1 C4 are alternate embodiments of various suction nozzles that might be employed in embodiments of the inventive digester, each configured to draw settled particulate matter from the floor of the inventive digester;

DETAILED DESCRIPTION

Generally, as with any vessel containing manure, the particles in a manure suspension inside of an anaerobic digester will settle. The settling rate of particles within a manure suspension is affected by particle's attributes (specifically, the size, shape, and density) relative to the density and viscosity of the liquid being passed through. If a particle is sufficiently large and dense, it will settle out of suspension as a discrete particle, such as a rock drops through a column of water. As a particle settles, it accelerates until the frictional drag on its surface equals the weight of the particle in the suspending fluid. Once friction and gravity are equal, the particle travels downward at a constant velocity called its terminal velocity. Settling solids appear as a cloud with a distinct boundary between the top of the cloud and the clear liquid above it. The speed at which the border between clear liquid and the cloud passes through a column is the settling velocity of the slurry. When the free-falling, settling particles reach the top of the sludge layer, they decelerate as the space between particles becomes smaller, and the velocity of liquid increases. The pressing of particles together squeezes liquid from between them to form a denser sludge layer settling on the floor of the lagoon.

Figure 1A:
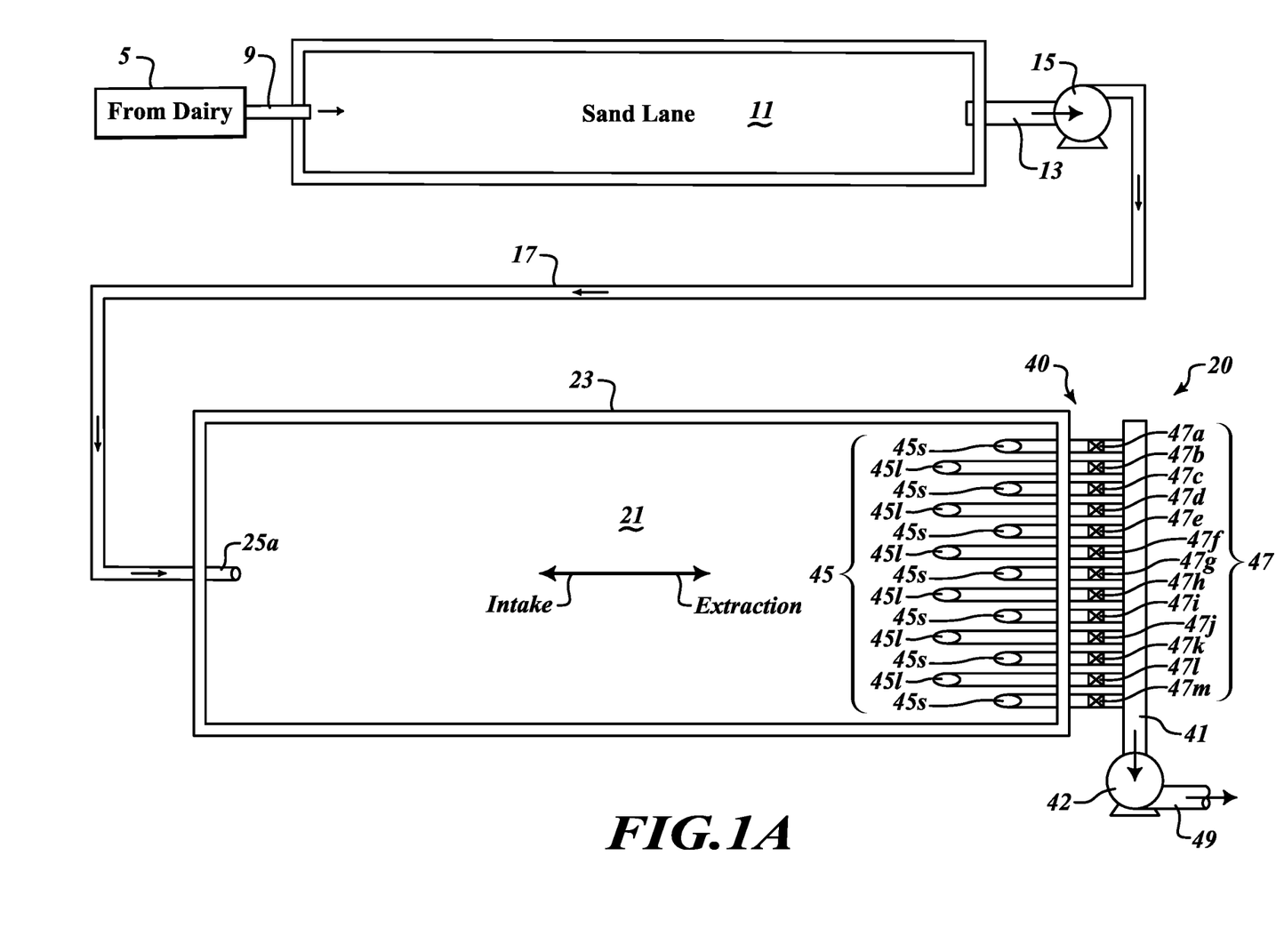
FIG. 1A is a plan view of a first embodiment of a covered lagoon anaerobic digester having the inventive manifold.
Figure 1B:
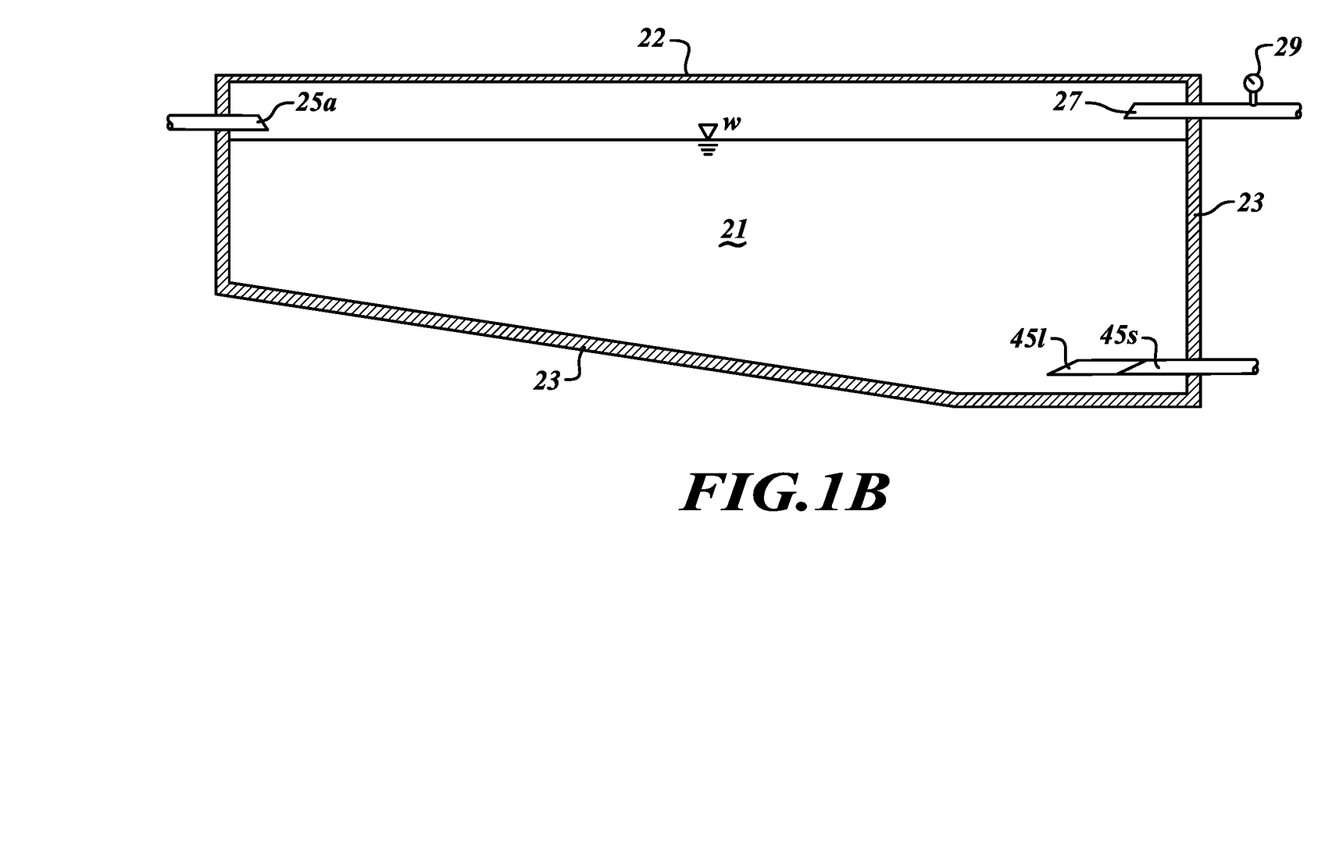
FIG. 1B is a side view of the first embodiment of the covered lagoon anaerobic digester having the inventive manifold.

Referring, now, to FIGS. 1A and 1B, a first embodiment of an inventive covered lagoon anaerobic digester 20 is portrayed along with the inventive extraction manifold 40. FIG. 1A depicts a plan view of the inventive covered lagoon anaerobic digester 20 and FIG. 1B portrays a side view of the same first embodiment of the inventive covered lagoon anaerobic digester 20. Generally, manure passes from a dairy 5 through a conduit 17 into the covered lagoon anaerobic digester vessel 21 through a first embodiment of an intake nozzle 25a. While FIG. 1A shows a drain system 9 drawing flush water and entrained manure from the dairy 5 and emptying into a sand lane 11. Other embodiments might include screens, wedge wire screens, rotary screen separators, and vibratory screen separators. Because none of the novelty of the instant invention resides in the employment of or means employed by a sand lane 11 and because the presently preferred embodiment includes use of the sand lane 11 to prevent the introduction of sand into the interior of the inventive covered lagoon anaerobic digester vessel 21 as sand merely occupies volume within the digester vessel 21; if allowed into the digester vessel 21, the sand will displace the digestate and will lessen biogas output of covered lagoon anaerobic digester 20 simply by occupying some of its volume.

Importantly, though the conduit 17 is depicted as moves manure and flush water from the dairy 5 into the digester vessel 21. The discussion will presume the presence of the sand lane 11 though such a sand lane 11 is not necessary for proper operation of the instant invention. Explanation will be clearer by presuming the removal of sand from the manure. As only manure is digestible; inert mineral matter such as sand, grit, or gravel or indigestible vegetable matter such as cellulose or lignin might, optionally, be filtered from the manure as it makes its transit from the dairy 5. As noted above, filtering such matter from the flow of manure tends to optimize production of biogas from digestion of the manure.

In the presently preferred embodiment, the covered lagoon anaerobic digester vessel 21 is defined by an outer impermeable membrane 23 and configured as a basin having a floor sloping downward from that side of the digester vessel 21. A intake nozzle 25a admits the above-described flow of manure from the conduit 17. Where configured as such, the flow of manure through the digester vessel 21 exposes the manure to the flora resident within the digester vessel 21 during the flow through the digester vessel 21. Conventionally, digester vessels 21 such as the exemplary digester vessel 21 are generally designed to have a length to width ratio of 5:1 resulting in a long generally rectangular shape. This elongate shape supports formation of a digestate plug that spans the interior of the digester vessel 21 a wall parallel to the intake face of the digester vessel 21. As manure collects on the intake side of this plug wall, hydraulic pressure is exerted evenly across the face of the plug urging it toward the extraction end of the digester vessel 21. As manure is admitted, the colloidal suspension that is manure moves through the digester vessel 21 moving as a monolithic structure through the digester vessel 21. The formed plug which moves, intact from the intake to the extraction ends of the digester vessel 21 advances towards the extraction end of the digester vessel 21 as a piston moves in a cylinder, thus given the name of plug flow digester to the digester vessel 21 configuration.

The plug is not solid, though, but is, rather, a colloidal structure or colloidal suspension. Unlike a solution, comprising solute and solvent constitute only one phase, a colloid has a dispersed phase (the suspended particles) and a continuous phase (the medium of suspension) that arise by phase separation. Typically, colloids do not completely settle or take a long time to settle completely into two separated layers. As such, the moving plug is a fragile but discernable structure within the digester vessel 21. It advances slowly through the digester vessel 21 as the digester flora consumes volatile oils within the manure producing biogas.

Optimally, the continual introduction of manure into the digester vessel 21 is performed to generate the least turbulence within the volume of manure between the digester vessel 21 wall at the intake end and the formed face of the plug. Minimizing turbulence fosters accretion of manure suspension across the formed "plug" of manure migrates toward the extraction side of the digester vessel 21. The additional volume of manure introduced behind the plug slowly pushes the plug of manure within the digester vessel 21 down advancing that plug toward the extraction manifold 40.

In a conventional covered lagoon anaerobic digester, digestate is moved out of the digester vessel 21 as it is urged through a siphon by the volume of manure introduced into the digester vessel 21 through the intake nozzle 25a. The flow into the digester vessel 21 presses digestate out of the extraction side of the digester vessel 21. The extraction manifold 40 is substituted for the simple siphon of the conventional digester. Rather than relying upon simply displacing a volume of manure, in the presently preferred embodiment of the invention a centrifugal pump 42 creates a suction in the plenum 41. In that embodiment, the suction draws digestate through the extraction manifold 40 comprising valves 47a through 47m admitting digestate collected from various shorter effluent pipes 45s and longer pipes 45l into the manifold plenum 41 which, ultimately is conveyed through a digestate pipe 49. But, in alternate embodiments, gravity, alone, can provide the necessary head such that the height of the water (manure) column above the several pipes 45 is enough to press the digestate through such of the pipes that are opened by the selected valve 47. It is important to note that the extraction pump 42 is not necessary so long as digestate will flow into the plenum 41 in response to any open valve 47.

Figure 2:
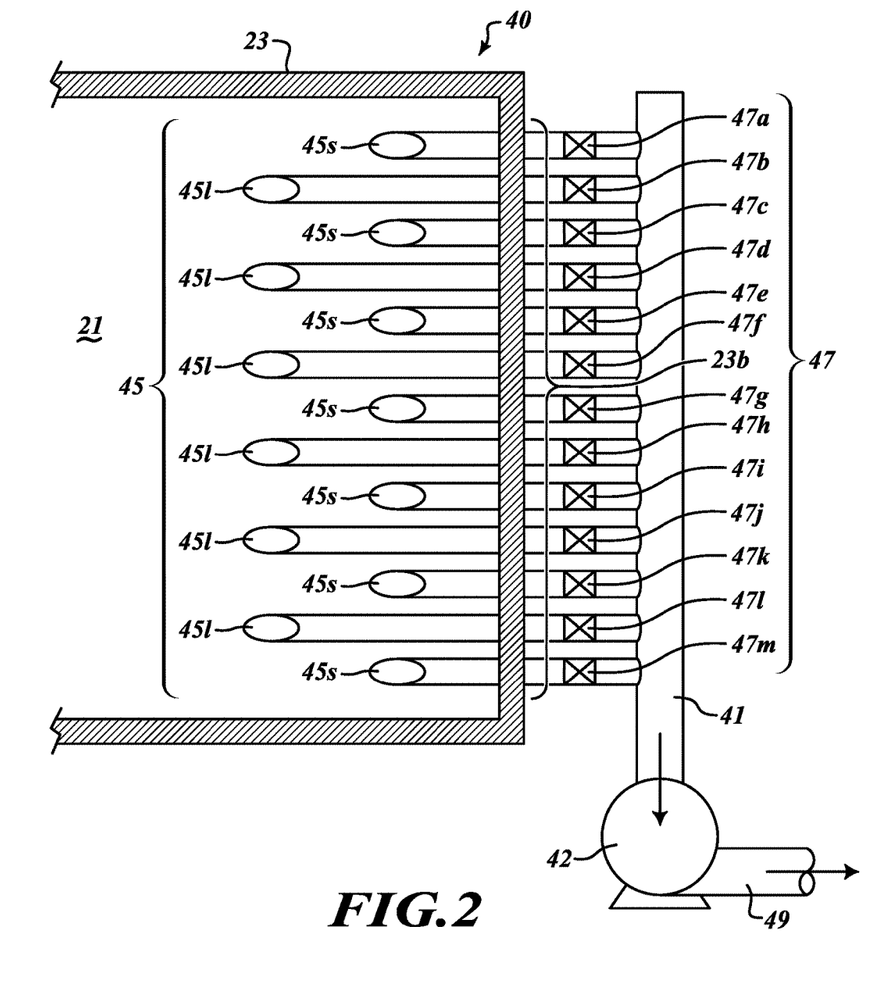
FIG. 2 is a detail view of the inventive manifold.

With reference, then, to FIGS. 1A and 1B, with further reference to FIG. 2, in the presently preferred embodiment, the inventive manifold is shown as situated on the extraction end of the digester vessel 21. Gas and nutrient-laden water escape the digester vessel 21, through a weir pipe 27. While most manure solids have, generally, settled from the digestate in the digester vessel 21, many key nutrients are water soluble. Because of the location of the weir pipe 27 relative to the surface level w within the digester vessel 21, both gas and water can be captured as distinct products, each having their separate value. Gas escapes the digester vessel 21 a biogas, combustible as fuel for heat and motion and the water digestate rich with nutrients for extraction as fertilizer.

The liquid digestate may be treated to remove most of the remaining solids that are rich in nutrients and such particulate as remains are too small to extract with simple mechanical processes. Several technologies are available, but centrifuge, pressure membrane, or flocculation are conventionally used to capture nutrients by precipitation and can address the pH of dairy manure. For example, dissolved air flotation (DAF) is one type of flocculation process used in wastewater treatment to remove and recover suspended solids. In a DAF system, polymers, compounded to bond with the small solids and their associated phosphorous and organic nitrogen, are added to the feedstock, creating clumps, which can be removed in various ways. The solids are then further dried. The resulting cakes can be applied as a fertilizer and soil amendment. They are, in theory, dense enough, relative to their nutrient value and moisture content, to transport further distances. The nutrient cake can, then, be used to manufacture a fertilizer.

Research is underway on techniques to remove more of the remaining nutrients from the recovered water. Technologies for recovery of nutrients from the recovered water include mechanical vapor recompression, vacuum evaporation, and pressure-driven membranes, which can partition the recovered water into a liquid nutrient-concentrate and a "clean water," potentially suitable for recycling as flush water. In such a manner, two valuable resources and clean water are recovered for the dairy farmer.

The contents of the above-described plug moves downward on the sloped floor of the digester vessel 21 under the influence of both the gravity acting on the plug and the incoming manure which presses the formed plug to the extraction end. Within the digester vessel 21 the settling manure and water fill the digester vessel 21 to the height w of the contents. As settling urges the manure solids precipitate and reside at the bottom of the column as presented to the extraction side of the digester vessel 21. An elastomer cover (not shown) seals the digester vessel 21; the elastomer is chosen to be an expandable cover and, thus, its elasticity serves to buffer biogas pressure within the digester vessel 21 by expanding to accommodate either a larger volume or smaller volume of gas within the digester vessel 21. What pressure exists under that cover is measured at a pressure gauge 29 which, absent other factors, along with exhausted volume of biogas can be used to judge biogas production within the digester vessel 21.

Apart from recaptured water digestate and biogas exhausted from the digester vessel 21 through the weir pipe 27, the extraction manifold 40 selectively eliminates digestate from the digester vessel 21 by working of one or more of the servo-actuated valves 47a through 47m, thereby to admit the eliminated digestate into the manifold plenum 41. In this preferred embodiment, the elasticity of the cover (not shown) allows the digester vessel 21 to store the methane gas in addition to providing a thermal and vapor barrier maintaining a more optimally constant temperature for encouraging methane production. The optimal temperature for methane production from covered lagoon digesters usually falls within the mesophilic temperature range, typically between 59 and 104° F. (15 and 40° C.). Produced methane or biogas that the digester vessel 21 collects is vented into storage through a weir pipe 27 generally motivated by the weight and elasticity of the cover to press the gas out of the cover in a manner analogous to the escape of air from a balloon.

While both of FIGS. 1A, 1B, and 2 contain details of the inventive manifold, the focus of the discussion moves principally to FIG. 2. Omissions of details in each of 1A and 1B that are present in FIG. 2 does not exclude those details from this preferred and any alternate embodiments. Rather, details omitted from one or another of the drawings (such as omission of the weir pipe 27 from FIGS. 1A, 1D, and 2) from any figure are omitted only to allow a clearer illustration that also facilitates a clearer explanation of the workings of the manifold. Therefore, discrepancies between the figures are not to be considered as contradictory explanations of the workings of the extraction manifold 40.

One such omission from FIGS. 1A and 1B is necessary passage which allows reclamation of gas and reclaimed water, the weir pipe 27. The weir pipe 27 functions both as a weir to the water by holding a specific volume of liquid manure suspension to level w within the digester vessel 21 while allowing escape of biogas for collection outside of the digester vessel 21.

At the weir pipe 27, such liquid as escapes the digester vessel 21 is, once suitably separated, a source of nutrients and water suitable for recycling as flush water. As the digester vessel 21 is, essentially a vast, narrow, and long settling tank, nearly all the liquid in the vicinity of weir pipe 21, at the surface, the nutrient-laden water is very susceptible for recovery processing because grit and particulate which might wear conveying pumps has settled from the suspension, the manure solids having settled from the suspension for a significant interval by the time that suspension reaches the weir pipe 27. So, in an exemplary dairy 5 having about 1,500 cows, approximately 500,000 gallons of flush water with entrained manure will be let into the digester vessel 21 and that flush water and manure may require about twenty days to transit the digester vessel 21 from the conduit 17 and intake nozzle 25 at the intake side to the weir pipe 27 at the extraction end. By that time, the manure digestate has settled significantly and the gas and reclaimed water may be efficiently discharged through the weir pipe 27 for use as fuel and flush water respectively. In most instances, a preferred embodiment collects the flush water such that it will be sent through pipelines to the long-term storage lagoon for later use. Because flush water is a critical need for operation of the dairy 5, prudent design will often include a storage lagoon to accommodate any variation in use or need for flush water.

Returning then to the extraction manifold 40, in the presently preferred embodiment, the extraction manifold 40 is mounted on the impermeable membrane bulkhead 23b at the extraction end of the digester vessel 21 in opposed relation to the intake nozzle 25 that terminates the conduit 17. The manifold 40 is mounted to traverse the membrane bulkhead 23b the impermeable membrane 23 comprises. A series of effluent pipes (generally 45, longer effluent pipes 45l and shorter effluent pipes 45s) each transverse the membrane bulkhead 23b to span between the interior of the digester vessel 21, through the membrane bulkhead 23b, each terminating at a bulkhead-facing side of one of a series of servo-actuated valves 47a-1 which, when open, communicate between the interior of the digester vessel 21 and the interior of the manifold plenum 41, enabling a flow of digestate from the interior of the digester vessel 21 into the manifold plenum 41. Once again, it is noted that while a presently preferred embodiment includes an extraction pump 42 to generate a suction in the plenum 41, the extraction pump 42 is not a necessary feature of the extraction manifold 40.

Within this application, the term "servo-actuated valve" is meant to describe any of a number of actuated valves 47 which might include knife valves, gate valves, globe valves, butterfly valves, ball valves, stem valves, and plug valves, and actuated by any of electrical, mechanical, hydraulic, or pneumatic means. In the presently preferred embodiment, servo-actuated valve refers to air-actuated knife valves which have proven to be more durable and serviceable in the environment of a covered lagoon anaerobic digester 20.

Each of the servo-actuated valves 47a-47m (collectively valves 47) is independently addressable. Thus, in response to a signal from a valve controller system 100 (discussed below relative to FIG. 3), any one or any combination of the servo-actuated valves 47a-47m may be selectively opened to provide a path for evacuating digestate from the interior of the digester vessel 21 into the manifold plenum 41. Movement is, optionally, assisted by a suction the extraction pump 42, such as the Daritech Autoprime™ generates as the extraction pump 42 draws digestate from the manifold plenum 41. The feature of independent opening (and, of course, closing) of the individual servo-actuated valves 47a-47m allows a concentration of suction to draw the digestate in proximity to the corresponding one of the effluent pipes 45. The effluent pipes 45 are situated in a pattern (in this case depicted as having alternately long and short lengths such that the open ends of the effluent pipes 45 are staggered to fully cover the lowest depths of the digester vessel 21) but other patterns of effluent pipes 45 are similarly practicable.

Referring to FIGS. 1C1-1C4, a goal of the arrangement of pipes 45 and the corresponding configuration of suction nozzles 43a, 43b, 43c, and 43d, is to remove all sludge from the interior of the digester vessel 21. Importantly, by incremental removing the sludge, the whole of the volume of sludge can, over the interval of a manifold duty cycle, completely remove collected sludge, sand, and other non-digestible matter without interrupting the production of biogas. Thus, unlike conventional means which requires at least partial removal of the cover from the lagoon digester vessel 21, and the consequentially required inoculation and gradual incremental return to operation by reintroducing flora to the digester vessel 21. In, for example, a simplest configuration of the nozzle, as depicted in FIG. 1C1, a pipe 45 which terminates in a straight cut nozzle 43a which draws all sludge immediately before the opening the nozzle 43a defines. In a first alternate embodiment, depicted in FIG. 1C2, rather than the straight cut nozzle 43a, the nozzle 43b exploits an angled end to concentrate the suction in a more elongate pattern than that swept clean by the suction directed through the straight cut nozzle 43a. By way of a further purpose-designed nozzle, the elbowed nozzle 43, depicted in FIG. 1C3, has the advantage of sweeping clean a circular swath which extends both immediately before and immediately behind the elbow nozzle 43c as well as to either side. Finally, still another nozzle, depicted in FIG. 1C4, exploits a peri-nozzular depression the membrane floor 23' defines in combination with a reverse angle nozzle 43d to entirely evacuate such sludge as the peri-nozzular depression might contain. In this alternate embodiment, the membrane floor 23' might well be dimpled much as interspersed such as those a surface of a golf ball might define. In any of the alternate embodiments such as the nozzles 43 depicted in FIGS. 1C1 through 1C4, the nozzles 43 can be arranged to, in concert, draw all precipitated sludge from the digester vessel 21.

To ensure that suction nozzles 43 can evacuate all of any sediment residing on or near the floor of the digester vessel 21, knowing the suction to be applied, the manifold 40 can be designed such that the overlapping scopes of the several effluent pipes 45 can completely sweep the floor of the digester vessel 21. Each pipe 45, when activated can remove all sludge from the digester vessel 21 within its individual scope, much as a nozzle from a vacuum cleaner can entrain dust without requiring actual contact with captured dust. Thus, by activating each of the servo-actuated valves 47a-47m (collectively valves 47) in turn and by fully stepping through activation and deactivation of the entire series of individual servo-actuated valves 47a-47m, the inventive manifold 40 will draw all settled digestate from the floor of the digester vessel 21. While the currently illustrated embodiment exploits several parallel pipes 45 arranged in a sequence of alternating long and short pipes 45l and 45s respectively (collectively pipes 45), to assure complete coverage of the floor of the digester vessel 21. Alternate embodiments might include patterns of placed suction nozzles for collecting sludge from corresponding spots on that floor to assure complete clearance of the that floor of the digesting vessel 21 such that the collection of pipes 45 can, by selective activation of the several valves 47, clear the entirety of floor on the extraction end of the digester vessel 21.

Centrifugal extraction pumps 42, where used for handling digestate, are selected to be the non-clog type. The extraction pump 42 should be robust. Extraction pumps 42 of the macerator type impeller or additional cutters with a cutting ring whereby stringy rags and other fibrous material can get shredded are presently preferable. When the specific speed of the extraction pump 42 is low, non-clog impellers are designed with fewer blades than in impellers for handling clear liquids. In extraction pumps 42 of high specific speed, the mixed flow impeller should generally have wide passages. It is notable that centrifugal extraction pumps 42 with non-clog impellers have less efficiency than those of normal design for handling clear liquids.

Figure 1C:
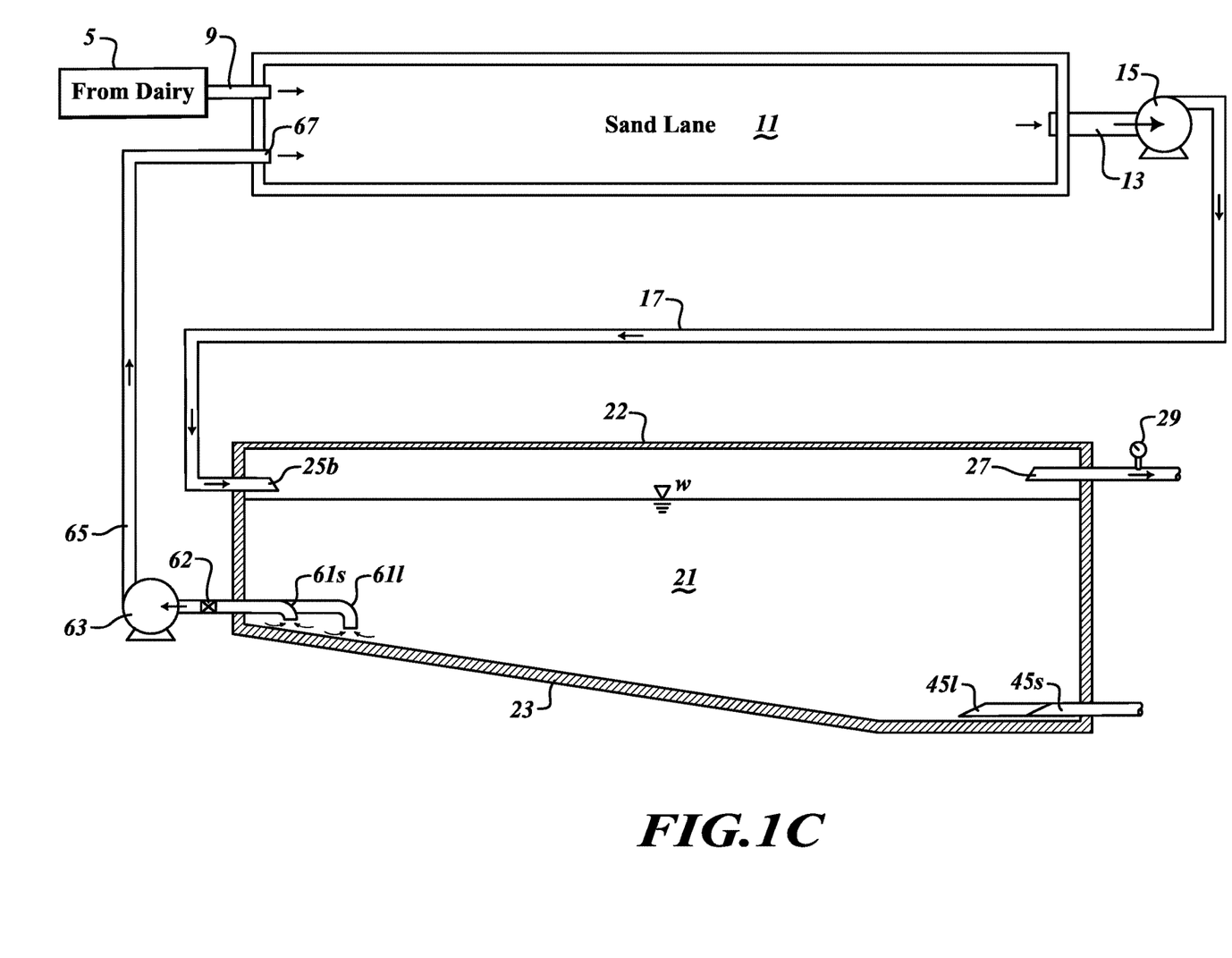
FIG. 1C is a side view of a second embodiment of a covered lagoon anaerobic digester having the inventive manifold.
Figure 1C:
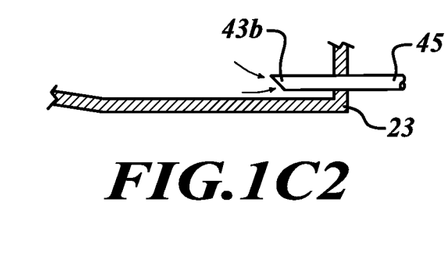
Figure 1C:
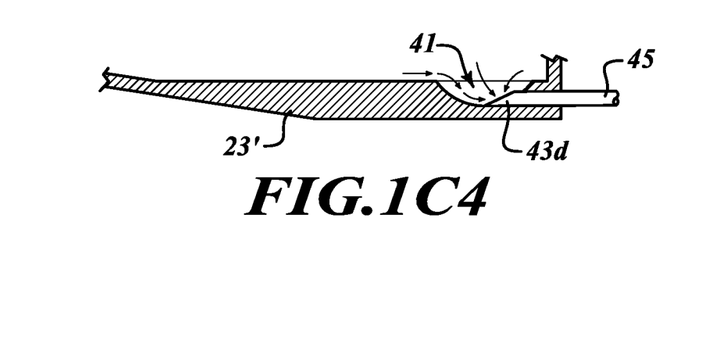
Figure 1C:
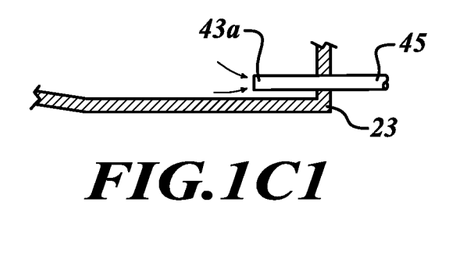
Figure 1C:
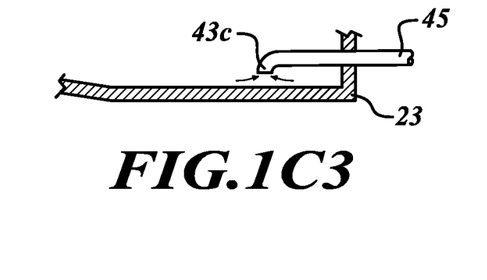
Figure 1D:
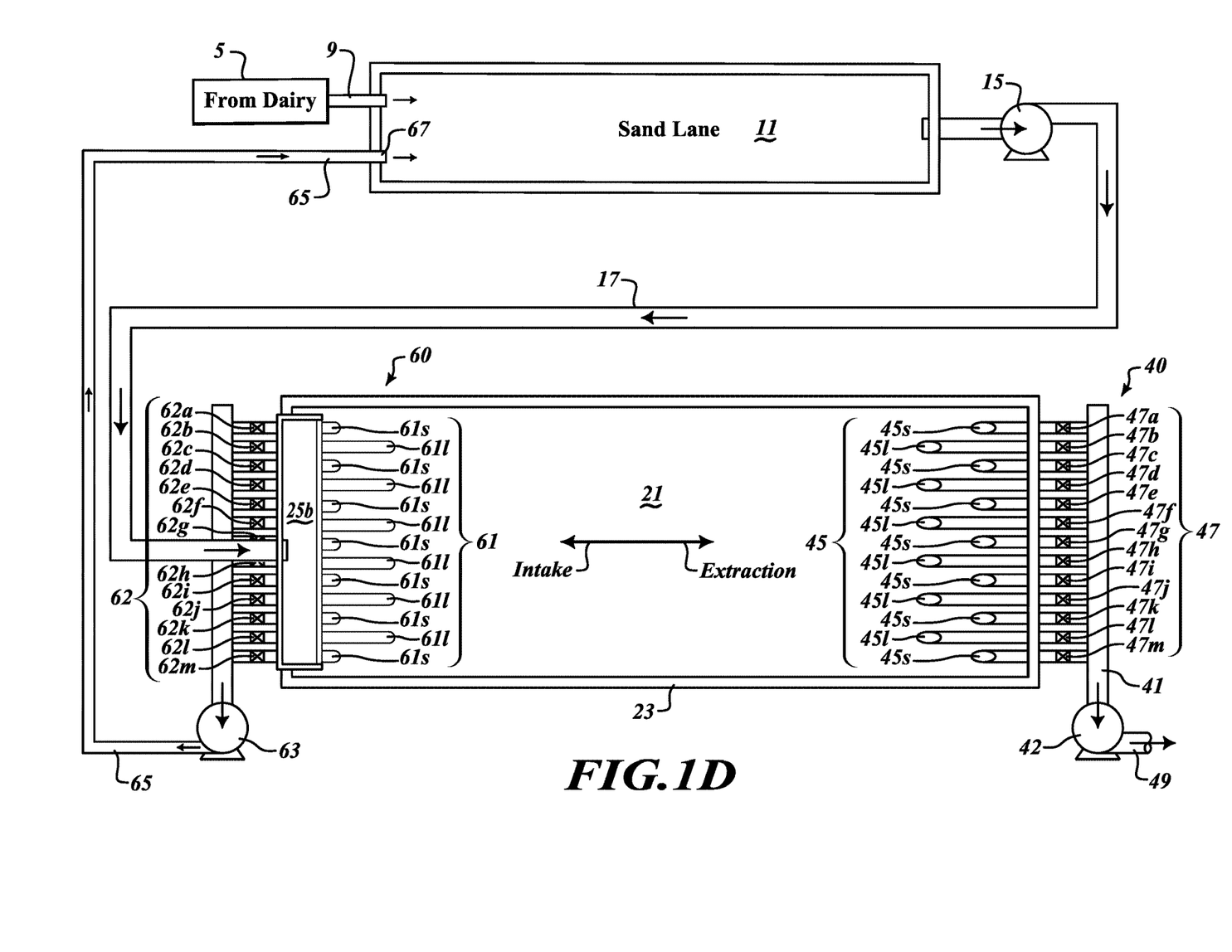
FIG. 1D is a plan view of the second embodiment of the covered lagoon anaerobic digester having the inventive manifold.

FIGS. 1C and 1D are, respectively, a side view and a plan view of an alternate embodiment of the inventive covered lagoon digester 20. A first difference between the alternate and preferred embodiments is the intake nozzle, the single pipe intake nozzle 25a is rather simple compared to the alternate embodiment wherein the nozzle is a rectangular water sheet-type nozzle 25b. Characterized by its rectangular cross-section, the sheet-type nozzle 25b is of the sort often used in decorative pools or water features and are constructed to spread the incoming manure across a broad shelf to simply place the incoming manure at the top of a water column on the incoming side of the digester vessel. The idea is to dissipate as much as possible any kinetic energy that propels the manure before its introduction into the digester vessel 21 thereby preserving the above-described plug within the digester vessel 21.

Moving manure disrupts the plug and as the manure moves with greater and greater energy, the moving manure generates turbulence within the digester vessel 21. At a certain point, the produced turbulence can erode the formed plug and keep manure solids in suspension by stirring the manure. On the preferred end of the spectrum, the lack of turbulence allows such sand or other indigestible matter to settle out of the manure. Manure flowing through the sheet nozzle 25b is captured between the formed plug and intake face of the digester vessel 21. In the calm captured pool so formed, such sand and indigestible matter falls through the manure suspension to collect at the intake end of the floor of the digester vessel 21.

There is little need to further describe the sand manifold 60 employed on the intake side of floor of the digester vessel 21. It is a duplicate of the inventive manifold 40 described above. Using the same staggering strategy for collecting precipitated sand and indigestible matter by selective activation of valves (collectively 62) to draw sand and manure into the several pipes (collectively 61 but made up of several longer pipes 61l and shorter pipes 61s with suction nozzles to collect sand). The sand manifold employs a similar sort of selective activation of the sand valves 62 to sweep up precipitate as is employed on the inventive manifold 40. To further separate the drawn manure from precipitated sand, a precipitate pump 63 propels the manure sand mixture through a sand mix pipe 65 to the sand lane 11. Sand collected from inside the digester vessel 21 is then conveyed by the sand mix pipe 65 and, then, reintroduced into the sand lane 11 and given a second chance to precipitate from the manure suspension. Manure that transits the whole of the sand lane 11 reenters the conduit 17 for reintroduction through the sheet nozzle 25b into the digester vessel 21 and there to be digested. Sand lanes 11 have proven especially well-suited to removing sand from manure.

Figure 3:
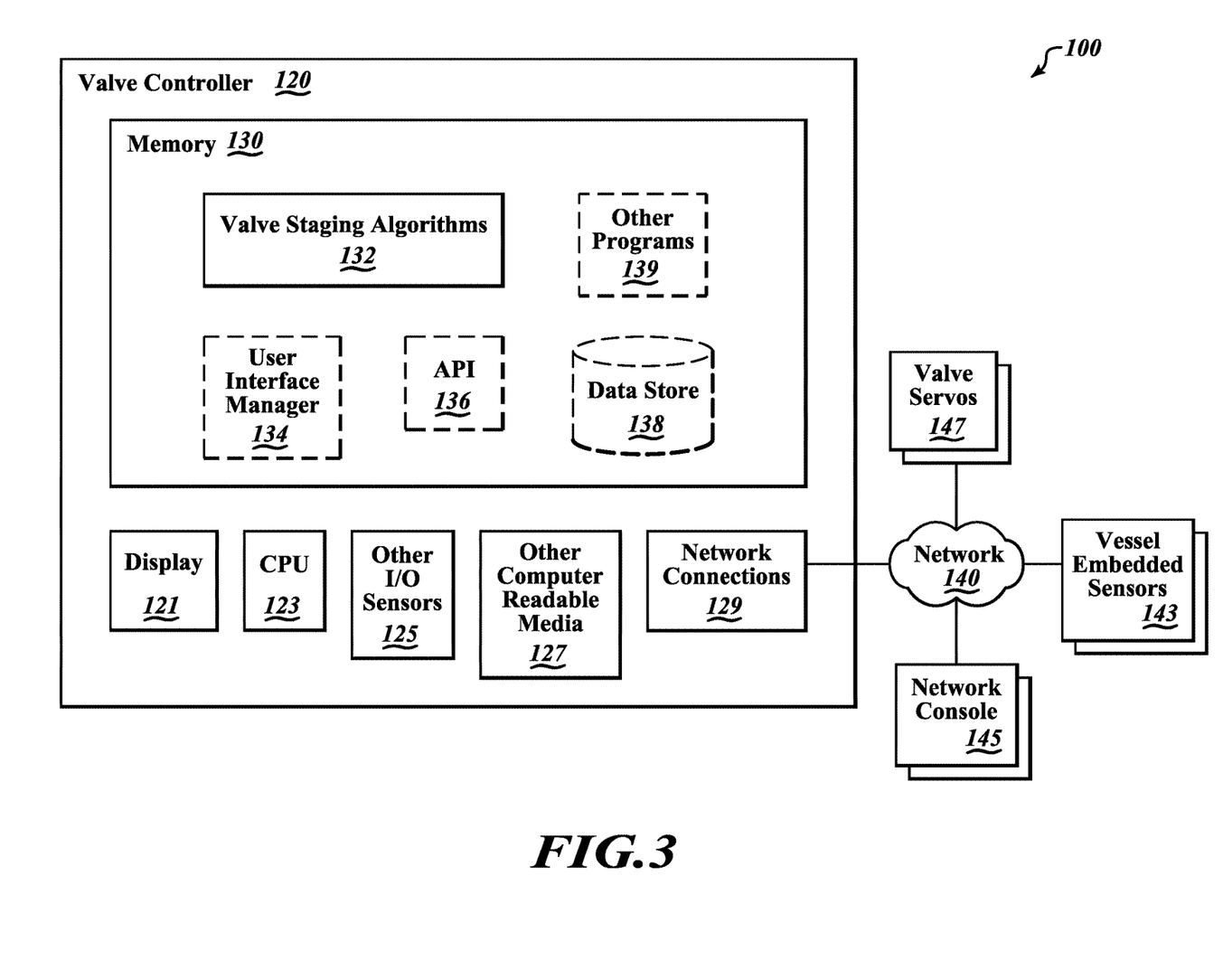
FIG. 3 is block diagram of a valve controller for the inventive manifold.

FIG. 3 is a non-limiting example block diagram of a valve controller system 100 according to an exemplary embodiment. It is to be noted that this embodiment of the invention does not show a connection between the instructions used to drive the display 121 device which would, presumably, be stored with other programs 139. As indicated above, the display 121 device can operate without specific connection to the remainder of the logical elements as in the case of using a portable tablet as a remote console for providing some of the described functions. In alternate embodiments, the instructions are resident upon the "display" device that might be a distinct controller as may be necessary to support an interactive user interface necessary to generate displays presenting the status of digester vessel 21 and the extraction manifold 40 (as the valve controller 120 receives signals at the I/O sensor buffer 125 from the vessel embedded sensors 143) indicative of that status and might, in some embodiments, be embodied in a touch-sensitive screen allowing the display 121 to serve as a keyboard input by interaction with the user interface manager 134.

In alternative embodiments a remote device such as a tablet or iPad® relying upon Bluetooth® connectivity might serve as a substitute for the display 121 allowing its omission from the valve controller 120. In short, though included here, a display 121 is not necessary for proper operation of the valve controller 120. Specific configuration of the display 121 is not necessary for the practice of the invention and has been removed from this discussion in order to assure clarity in the explanation of the necessary elements of the controlling the inventive manifold 40 in accord with the previous discussion.

Focusing, then on a valve staging algorithm 132 within the digester valve controller 120 and its proper recognition of the status of digestion with the digester vessel 21 based upon signals generated at the vessel embedded sensors 143 present within the digester vessel 21. Signals received from the vessel embedded sensors 143 which sense, individually by distinct conventional sensor means (not shown), such indicators of digester status to optionally include: liquid level, flow of liquid and flow of gas, pH, temperature, conductivity, biogas pressure and volume, fluorescence, volatile fatty acids (VFA), bicarbonate alkalinity, chemical oxygen demand (COD), total organic carbon (TOC), UV-absorbance, turbidity/suspended solids, methane ($CH_4$) or carbon dioxide ($CO_2$), or ammonium and time stamping those readings so as to reflects status of the digester at defined times. For each embodiment, only some of these sensors are necessary to convey a status of digestion. In the simplest configuration, only the volume of biogas passing out through the weir pipe 27 and gas pressure measured in the digester vessel 21 would be sufficient to roughly optimize production. Further measurement or distinct measurement of these several variables serves to further refine or to optimize algorithms more rapidly using this additional information to hone the algorithms.

Signals are received from the vessel embedded sensors 143 through the network 140 are directed to the I/O sensor buffer 125. In the digester valve manifold controller 120 may include nonvolatile memory containing instructions stored at other programs 139 that enable a central processor 123 to perform the above-described sensing of digester vessel 21 status through the vessel embedded sensors 143 received at the I/O sensor buffer 125. Further, the operation of the digester valve manifold controller 100 may be enhanced by other programs 139, these programs configured for garnering, where such are accessible, weather forecasts, seasonal variations in manure output, flow sensors showing volume of manure received from sensors in the dairy 5 and from further information sources.

Note that although specific user interfaces have been described above, other embodiments may expose functionality of the valve controller 120 in other ways. For example, the digester valve manifold controller 120 may also or instead by presented in other contexts, such as on a home screen or other portion of an Internet interface. The "Internet of things" (IoT) is becoming an increasingly frequent motif for control systems such as thermostats and lawn irrigation controllers. Simply put, this is the concept of basically connecting any device with an on and off switch to the Internet (or to communicate with each other).

Note that one or more general purpose or special purpose computing systems/devices may be used to implement the digester valve manifold controller 100. In addition, the valve controller system 100 may comprise one or more distinct computing systems/devices and may span distributed locations. Furthermore, each block shown may represent one or more such blocks as appropriate to a specific embodiment or may be combined with other blocks. Also, the valve controller 120 may be implemented in software, hardware, firmware, or in some combination to achieve the capabilities described herein.

In the embodiment shown, digester valve manifold controller 120 comprises a computer memory ("memory") 130, a display 121, one or more Central Processing Units ("CPU") 123, I/O buffer 125 (e.g., for holding signals from both vessel embedded sensors 143 and interface devices such as keyboard, mouse, and the like), other computer-readable media 127, and data delivered through the network 140. The valve controller 120 includes an API 136 is shown as residing in memory 130. An application programming interface ("API") 136 is a computing interface that defines interactions between multiple software or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. The API 136 can be entirely custom, specific to a component, or designed based on an industry-standard to ensure interoperability. Through information hiding, APIs 136 enable modular programming, allowing users to use the interface independently of the implementation. Thus, in other embodiments, some portion of the contents, some or all of the components of the valve controller 120 may be stored on or transmitted over the other computer-readable media 127. The components of the digester valve manifold controller 120 preferably execute on one or more CPUs 123 and perform the techniques described herein. Other code or programs 139 (e.g., an administrative interface, a Web server, and the like) and potentially other data repositories, such as data store 138, also reside in the memory 130, and preferably execute on one or more CPUs 123. Of note, one or more of the components in FIG. 3 may not be present in any specific implementation. For example, some embodiments may not provide other computer readable media 127 or a display 121.

The digester valve manifold controller 120 is shown executing in the memory 130 of the computing system 100. Also included in the memory 130 are a user interface manager 134 and an application program interface ("API") 136. The user interface manager 134 and the API 136 are drawn in dashed lines to indicate that in other embodiments, functions performed by one or more of these components may be performed externally to the digester valve manifold controller 120.

The user interface manager 134 provides a view and a controller that facilitate user interaction with the valve controller 120 and its various components. For example, the user interface manager 134 may provide interactive access to the valve manifold 120, such that users can interact with the valve controller 120 to delay or alter removal of digestate to accommodate transportation timing to convey digestate to agricultural sites. In some embodiments, access to the functionality of the user interface manager 134 may be provided via a Web server, possibly executing as one of the other programs 139. In such embodiments, a user operating a Web browser executing on one of the client devices can serve as network console 145 can interact with the valve controller 120 via the user interface manager 134.

The API 136 provides programmatic access to one or more functions of the valve controller 100. For example, the API 136 may provide a programmatic interface to one or more functions of the valve controller 120 that may be invoked by one of the other programs 106 or some other module. In this manner, the API 136 facilitates the development of third-party software, such as user interfaces, plug-ins, adapters (e.g., for integrating functions of the valve controller 120 into Web applications), and the like.

In addition, the API 136 may be in at least some embodiments invoked or otherwise accessed via remote entities, such as code executing on one of the vessel embedded sensors 142, or from the network console 145, to access various functions of the valve controller 120. The API 136 may also be configured to provide management widgets (e.g., code modules) that can be integrated into the other programs 139 and that are configured to interact with the valve controller 120 to make at least some of the described functionality available within the context of other applications (e.g., mobile apps).

The valve controller 120 interacts via the network 140 with vessel embedded sensors 142, status information from the servo-actuated valves 47a-47m, and network console 145 systems. The network 140 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The network console 145 may include any systems that provide data to, or utilize data from, the digester valve manifold controller 120, including Web browsers, e-commerce sites, calendar applications, email systems, social networking services, and the like.

In an example embodiment, components/modules of the valve controller 100 are implemented using standard programming techniques. For example, the digester valve manifold controller 120 may be implemented as a "native" executable running on the CPU 123, along with one or more static or dynamic libraries. In other embodiments, the valve controller 100 may be implemented as instructions processed by a virtual machine that executes as one of the other programs 139. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and can communicate using conventional message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the digester valve manifold controller 120, such as in the data stores 138 and can be available by standard mechanisms such as through C, C++, C#, and Java APIs; libraries for accessing files, databases, or other data repositories; through scripting languages such as XML; or through Web servers, FTP servers, or other types of servers providing access to stored data. The data stores 138 or the network console 140 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the digester valve manifold controller 120 may be implemented or provided in other manners, such as at least partially in firmware or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all the components or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for location-based recommendation are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

In operation, then, the valve staging algorithms 132 and the vessel embedded sensors 143 are the primary drivers informing the valve controller's 120 operation of the digester extraction manifold 40 and, in turn, actuate the extraction pump 42 and servo-actuated valves 47a-47m to allow the inventive manifold 40 to clean the covered lagoon digester 10 allowing it to eliminate sediment. Advantageously, the selective actuation of the servo-actuated valves 47 allows application of the full suction the extraction pump 42 generates to come to bear at the localized proximity to the selected effluent pipes to corresponding to those open servo-actuated valves 47a-47m. Because only one or few of the valves are open at any one time, those valves enjoy the concentration of suction such that any one extraction nozzle 43 can completely remove nearby solids in the digestate from the region near the extraction nozzle 43 of the membrane floor 23' of the digester vessel 21. This incremental removal of particulate in the performance of normal day-to-day operations obviates the need for complete dredging of the digester vessel 21. By doing removing small volumes of digestate under the influence of great pressure at short intervals, daily, in standard operation, no compacted digestate or precipitated solids remain in the digester vessel 21 upon the completion of a duty cycle. By clearing all non-digestible matter preserves the volume the matter would otherwise occupy such that the complete volume of the digester vessel 21 remains available for digestion of volatile solids in the manure.

By preserving this volume for digestion, a smaller digester vessel 21 can perform the digestion larger build will accomplish in conventional digesters; thus, the advantage of the inventive digester vessel 21 become clear. Most importantly, because the inventive method maintains the digester vessel 21 without sludge, its operation can be continuous and not requiring shutdown and dredging to facilitate removal. Because no dredging is necessary, there is no need to remove the cover covering the lagoon digester and, thereby, exposing the digesting flora to oxygenated ambient air killing the anaerobic bacteria so exposed. With continual removal of sand and digestate, no interruption of production and no potential for bacteria upset occurs. The process of startup also requires inoculation of the digester vessel 21 and the necessarily slow buildup of activity to return to full production.

A further and important feature of operation occurs as gas production is correlated with the data sensed at the various vessel embedded sensors 142. While there are known relationships between, for example, ambient temperature and gas production or pH and gas production, these provide guidance for iterative processes by which the valve controller 100 can refine the valve staging algorithms 132. Biogas production is ascertained and in correlation with patterns of activation of the extraction valves 47 will allow comparison of biogas production resulting from various patterns of actuation of the extraction valves 47. Thus, which is the optimal pattern based upon sensed conditions within the digester vessel 21 as sensed by the vessel embedded sensors 142. Such optimization might be continually reexamined by further refined by algorithms used to map curves determined as data is captured to establish best operation and thereby optimize that patterns used for removal of settled solids from each location proximate to each extraction nozzle 43 in turn.

A machine learning algorithm is, optionally, stored among the valve staging algorithms 132, thus, to use computers systems such as the CPU 123 and data store 138 to automatically learn from stored data in the data store 138 especially past observations as from the vessel embedded sensors 142 and data garnered from the other programs 139 to find predictive models to make accurate predictions of anticipated future biogas production. The main goal of any effort at machine learning to refine the valve staging algorithm 132 is to make highly accurate prediction based on the received data at the I/O sensor buffer 125. By continually reviewing volume of biogas production, subjecting this valve staging algorithm 132 to machine learning develops knowledge from past experience to accommodate and predict biogas production in all expected conditions relating to the status of the digester vessel 21.

In machine learning, the training data such as known parameters defining biogas production as a function of, say, temperature, is fed as input to the machine learning algorithms that are used to discover further predictive relationships. As a result of the training, the recorded dataset allows a model to be built. Using the model, biogas production can be predicted based upon received data (test data). There exist algorithms known to those skilled in the art which enable each of supervised learning and unsupervised learning that are classified as either iterative or non-iterative based on their way of execution.

Supervised learning is a machine learning method that maps input and output based on the labeled training data which can be used to predict the future data. The goal of supervised machine learning is to build a model and when exposed to new data, the performance of the machine must be improved. The known relationships between the recorded existing readings by the vessel embedded sensors 142 can be combined to form a model, informed by known relationships, to predict whether the likely output of biogas.

Because the only variables over which the valve controller 100 maintains control is the duration and location of the opened and the closed servo-activated valves 47a-47m and the remaining variables such as temperature, pH, and total solids in suspension are sensed, but not controlled, a topography of the model can be set up. Once that topography exists, various durations (and, thus, volumes) of elimination of digestate can be tried, adjusted, and over time, optimized. As such, the manifold can develop better and better valve staging algorithms 132 by further and further machine learning.

As an example of machine learning by the valve controller 100, a dairy that produces approximately 500,000 gallons of manure and flush water entering the digester each day. Because approximately 400,000 gallons of flush water can be readily reclaimed through the gas and weir pipe 27, the volumes would dictate the need to remove about 100,000 gallons of settled solid digestate through the extraction manifold 40. Because the volume of manure is based upon the number of cows contributing rather than the volume of flush water, the volume of digestate requiring removal will not change greatly from day to day. In a first mode, for example, presuming continual removal from various of the effluent pipes 45 by continually opening and closing of the servo-actuated valves 47a-47m, the valve controller 100 would generate a flow volume to feed to a separator or a separator feed pit, at lower flow rates of 70 gallons per minute in this case. So, in the exemplary digester vessel 21, the valve controller 100 might start at a first iteration where each servo-actuated valve is open for approximately 2 to 10 minutes in a constellation of effluent pipes 45 having 10 to 20 suction points. From there, the pattern of opening and closing can vary, the intervals growing or diminishing incrementally as the algorithm seeks local minima and maxima, and performance is repeatedly measured and compared with past results.

In a second mode of learning, a much higher flow removal rate is selected, perhaps by simultaneously opening two or more of the servo-actuated valves 47a-47m, thereby to create a much larger suction solids settling area. The flow through each of the effluent pipes 45 is independently measured. It is presumed that the digestate will always flow in the path of least resistance so comparison of the flow rates will indicate where more of the solid digestate has accumulated. By sensing where the flow is the least, the greatest amount of suction can be applied by closing some of the then-open servo-actuated valves to free up the flow in the lowest flowing effluent pipes 45. From that study, patterns of flow will emerge and can be "learned" by the valve controller 100.

Once optimal patterns are established, further refinement of the algorithm may take place by alternating intervals of high-volume discharge with the earlier studied low-volume discharge schema, i.e. the 350 gallon per minute flow versus the 70 gallon per minute flow in order to determine lengthening and shortening or eliminating each to find the optimal removal rate and pattern. Another tracked variable in such a system might be the pump duty cycle. By way of explanation, the pump under the high-volume flow rate will operate through an $\frac{1}{5}$ the time of the low-volume flow rate to remove an equal amount of digestate. However, the high-flow option might require further separation through, for example, a centrifuge. Thus, in determining an optimum flow, the price of operation of each of these two large motors might also be included as well as the rates for electricity, especially as those rates might vary through the day. Each of these parameters can be optimized by machine learning to produce the most efficient dairy.

The scope of the invention is determined by the claims that follow and the preceding discussion merely details a presently preferred embodiment. Thus, departures may be made from such details without departing from the spirit or scope of the invention. The invention is defined in the following claims.

What is claimed is:

1. A covered lagoon digester comprising:
   a digester vessel being shaped generally as a rectangular prism lacking an upward facing face and having a floor sloping generally downward from an intake face to an extraction face of the digester vessel, the intake face and extraction face being each oriented vertically and being situated in opposed relation on a longer horizontal axis;
   a cover to seal the digester vessel at its upward facing face, the seal and cover in concert to catch and retain a volume of biogas;
   the intake face defining an intake nozzle for admitting manure into an interior of the digester vessel;
   a plurality of effluent pipes, each effluent pipe terminating in an extraction nozzle and including an attached independently addressable actuatable valve situated on an opposite end of the effluent pipe from the extraction nozzle, each actuatable valve in communication with a manifold plenum such that actuation of the valve establishes communication between the corresponding extraction nozzle and the manifold plenum, each of the extraction nozzles being situated to draw digestate from the floor generally in a region of the floor adjacent to the extraction face and in proximity to the extraction nozzle when the corresponding attached independently addressable actuatable valves are actuated; and a valve controller system to generate signals to actuate, in turn, each of the independently addressable actuatable valves to remove digestate from the region of the floor adjacent to the extraction face.

2. The digester of claim 1 wherein the valve controller system:
includes sensors to generate signals representative of at least one of a sensed status group consisting of liquid level, flow of liquid, flow of gas, pH, temperature, conductivity, biogas pressure and volume, fluorescence, volatile fatty acids (VFA), bicarbonate alkalinity, chemical oxygen demand (COD), total organic carbon (TOC), UV-absorbance, turbidity/suspended solids, methane ($CH_4$) or carbon dioxide ($CO_2$), and ammonium; and
records time of sensing corresponding to each generated signal, thereby to time stamp each of recorded signals received from the sensors in the sensed status group to populate a data store.

3. The digester of claim 2 wherein the valve controller system uses machine learning to generate and optimize algorithms to effect production of biogas based upon the recorded signals retrieved from the data store.

4. The digester of claim 1, wherein the extraction nozzles are configured in one of a set of nozzle configurations selected from a nozzle configuration group consisting of straight cut nozzle, angled end nozzle, elbow nozzle, and reverse angle nozzle sent into a peri-nozzular depression in the membrane floor.

5. The digester of claim 1, further comprising a sand extraction manifold including:
a plurality of sand extraction pipes, each sand extraction pipe terminating in a sand extraction nozzle and including an attached independently addressable actuatable sand valve, the sand valves being in communication with a sand extraction plenum such that upon being actuated, the actuated sand valve establishes communication between the corresponding sand extraction nozzle and the sand extraction plenum, each of the sand extraction nozzles being situated to draw sand and manure from the floor generally in a region of the floor adjacent to the intake face and in proximity to the sand extraction nozzle when the corresponding attached independently addressable actuatable sand valve is actuated; and
wherein the valve controller system to generates further signals to actuate, in turn, each of the independently addressable actuatable sand valves to, in concert, remove sand and manure from the region of the floor adjacent to the intake face.

6. The digester of claim 1, wherein the defined intake nozzle is selected to be a water sheet nozzle.

7. The digester of claim 1 wherein an extraction pump draws digestate from an extraction plenum thereby generating a suction within the plenum.

8. An extraction manifold for extracting digestate from a covered lagoon digester including a digester vessel being shaped generally as a rectangular prism lacking an upward facing face and having a floor sloping generally downward from an intake face to an extraction face of the digester vessel, the intake face and extraction face being each oriented vertically and being situated in opposed relation on a longer horizontal axis and a cover to seal the digester vessel at its upward facing face, the seal and cover in concert to catch and retain a volume of biogas, the extraction manifold comprising:
a plurality of effluent pipes, each effluent pipe terminating in an extraction nozzle and including an attached independently addressable actuatable valve situated on an opposite end of the effluent pipe from the extraction nozzle, each actuatable valve in communication with a manifold plenum such that actuation of the valve establishes communication between the corresponding extraction nozzle and the manifold plenum, each of the extraction nozzles being situated to draw digestate from the floor generally in a region of the floor adjacent to the extraction face and in proximity to the extraction nozzle when the corresponding attached independently addressable actuatable valves are actuated; and
a valve controller system to generate signals to actuate, in turn, each of the independently addressable actuatable valves to remove digestate from the region of the floor adjacent to the extraction face.

9. The extraction manifold of claim 8 wherein the valve controller system:
includes sensors to generate signals representative of at least one of a sensed status group consisting of liquid level, flow of liquid, flow of gas, pH, temperature, conductivity, biogas pressure and volume, fluorescence, volatile fatty acids (VFA), bicarbonate alkalinity, chemical oxygen demand (COD), total organic carbon (TOC), UV-absorbance, turbidity/suspended solids, methane ($CH_4$) or carbon dioxide ($CO_2$), and ammonium; and
records time of sensing corresponding to each generated signal, thereby to time stamp each of recorded signals received from the sensors in the sensed status group to populate a data store.

10. The extraction manifold of claim 9 wherein the valve controller system uses machine learning to generate and optimize algorithms to effect production of biogas based upon the recorded signals retrieved from the data store.

11. The extraction manifold of claim 8, wherein the extraction nozzles are configured in one of a set of nozzle configurations selected from a nozzle configuration group consisting of straight cut nozzle, angled end nozzle, elbow nozzle, and reverse angle nozzle sent into a peri-nozzular depression in the membrane floor.

12. The extraction manifold of claim 8, further comprising a sand extraction manifold including:
a plurality of sand extraction pipes, each sand extraction pipe terminating in a sand extraction nozzle and including an attached independently addressable actuatable sand valve, the sand valves being in communication with a sand extraction plenum such that upon being actuated, the actuated sand valve establishes communication between the corresponding sand extraction nozzle and the sand extraction plenum, each of the sand extraction nozzles being situated to draw sand and manure from the floor generally in a region of the floor adjacent to the intake face and in proximity to the sand extraction nozzle when the corresponding attached independently addressable actuatable sand valves is actuated; and
wherein the valve controller system to generates further signals to actuate, in turn, each of the independently addressable actuatable sand valves, in concert, to remove sand and manure from the region of the floor adjacent to the intake face.

13. The extraction manifold of claim 8, wherein the defined intake nozzle is selected to be a water sheet nozzle.

14. The extraction manifold of claim 8 wherein an extraction pump draws digestate from the extraction plenum thereby generating a suction within the plenum.

15. A method for extracting digestate from a covered lagoon digester including a digester vessel being shaped generally as a rectangular prism lacking an upward facing face and having a floor sloping generally downward from an intake face to an extraction face of the digester vessel, the intake face and extraction face being each oriented vertically and being situated in opposed relation on a longer horizontal axis and a cover to seal the digester vessel at its upward facing face, the seal and cover in concert to catch and retain a volume of biogas, the method comprising:
- situating each of a plurality of effluent pipes, each effluent pipe terminating in an extraction nozzle and including one of the plurality of independently addressable actuatable valve, each valve situated on an opposite end of one of the plurality of effluent pipes from the extraction nozzle, each actuatable valve in communication with the manifold plenum such that actuation of the valve establishes communication between the corresponding extraction nozzle and the manifold plenum, each of the extraction nozzles being situated to draw digestate from the floor generally in a region of the floor adjacent to the extraction face and in proximity to the extraction nozzle when the corresponding attached independently addressable actuatable valves are actuated;
- retrieving an algorithm at a valve controller system, the algorithm defining a sequence of activation cycles and activation intervals, the algorithm causing the valve controller system to generate signals to activate the actuatable valves, in turn and in accord with the sequence; and
- using the valve controller system to generate the signals in response to the retrieved algorithm thereby to remove digestate from the region of the floor adjacent to the extraction face.

16. The method of claim 15 further comprising:
actuating an extraction pump to draw digestate from an extraction plenum thereby generating a suction within the plenum.

17. The method of claim 15 which further includes:
recording signals to store recorded signals representative of the status of the digester vessel, the signals being generated and time-stamped by at least one of a status sensor group consisting of a liquid level sensor, a flow of liquid sensor, a flow of gas sensor, a pH sensor, a temperature sensor, a conductivity sensor, a biogas pressure sensor and volume sensor, a fluorescence sensor, a volatile fatty acids (VFA) sensor, a bicarbonate alkalinity sensor, a chemical oxygen demand (COD) sensor, a total organic carbon (TOC) sensor, a UV-absorbance sensor, a turbidity/suspended solids sensor, a methane ($CH_4$) sensor, a carbon dioxide ($CO_2$) sensor, and an ammonium sensor; and
recording time of sensing corresponding to each recorded signal, thereby to time stamp each of recorded signals received from the sensors in the sensed status group to populate a data store.

18. The method of claim 17 further comprising:
at the valve controller system, using machine learning to generate and optimize algorithms to effect production of biogas based upon the recorded signals retrieved from the data store.

19. The method of claim 15, wherein the extraction nozzles are configured in one of a set of nozzle configurations selected from a nozzle configuration group consisting of straight cut nozzle, angled end nozzle, elbow nozzle, and reverse angle nozzle sent into a peri-nozzular depression in the membrane floor.

20. The method of claim 15, further comprising:
- using the valve controller system to generate further signals to actuate, in turn, each of a plurality of independently addressable actuatable sand valves to remove sand and manure from the region of the floor adjacent to the intake face; and
- drawing manure and sand from the intake end of the floor of the digester vessel through a plurality of sand extraction pipes, each sand extraction pipe terminating in a sand extraction nozzle and including one of the plurality of independently addressable actuatable sand valves, each of the plurality of sand extraction valves being in communication with a sand extraction plenum such that upon being actuated in response to the generated signals, the actuated sand extraction valve establishes communication between the corresponding sand extraction nozzle and the sand extraction plenum, each of the sand extraction nozzles being situated to draw sand and manure from the floor generally in a region of the floor adjacent to the intake face and in proximity to the sand extraction nozzle the corresponding attached independently addressable actuatable sand valves; and
- conveying the extracted sand and extracted manure to a sand lane to precipitate the extracted sand from the extracted manure.

\* \* \* \* \*